United States Patent [19]

Crevling, Jr. et al.

[11] Patent Number: 4,782,261

[45] Date of Patent: Nov. 1, 1988

[54] CONNECTION OF MOTOR BRUSH HOLDER TO STATOR COIL

[75] Inventors: R. Lent Crevling, Jr., Williamsport; Rudolph W. Wacek, Montoursville, both of Pa.

[73] Assignee: Shop-Vac Corporation, Williamsport, Pa.

[21] Appl. No.: 84,394

[22] Filed: Aug. 11, 1987

[51] Int. Cl.$^4$ .................. H01L 41/08; H01R 4/26; H02K 5/14

[52] U.S. Cl. .................... 310/242; 310/42; 310/71

[58] Field of Search ............. 310/71, 228, 239, 241, 310/242, 245, 247, 249, 42

[56] References Cited

U.S. PATENT DOCUMENTS

| | | | |
|---|---|---|---|
| 3,176,177 | 3/1965 | Huston | 310/247 |
| 3,436,576 | 4/1969 | Klebe, Jr. | 310/242 |
| 3,539,855 | 11/1970 | Blume | 310/239 |
| 4,322,647 | 3/1982 | Neroda et al. | 310/71 |
| 4,656,380 | 4/1987 | Strobl | 310/71 |

Primary Examiner—Patrick R. Salce
Assistant Examiner—D. L. Rebsch
Attorney, Agent, or Firm—Ostrolenk, Faber, Gerb & Soffen

[57] ABSTRACT

Each brush of a wound rotor type electric motor is mounted in a conducting formed-metal tube having an integral tab that is provided with a narrow slit having an enlarged mouth. The latter faces the commutator that is carried by the wound rotor and, as the tube and its assembled brush are moved radially inward to their operating positions, initially receives one end of magnet wire that forms a stator winding. As the stator winding and its associated field stack are moved into operative position with respect to other elements of the stator an indexing formation of the stator positions the wire end for engagement with the tab of the tube. With the tube in its operating position, the wire end is disposed within the narrow slit and is clamped between the tab jaws that are on opposite sides of the slit. During the relative movement between the tube and wire end, the jaw edges cut through the thin coating of insulation on the wire end and the wire end is slightly deformed by the jaws to form a reliable electrical connection directly between the tab and the wire.

11 Claims, 5 Drawing Sheets

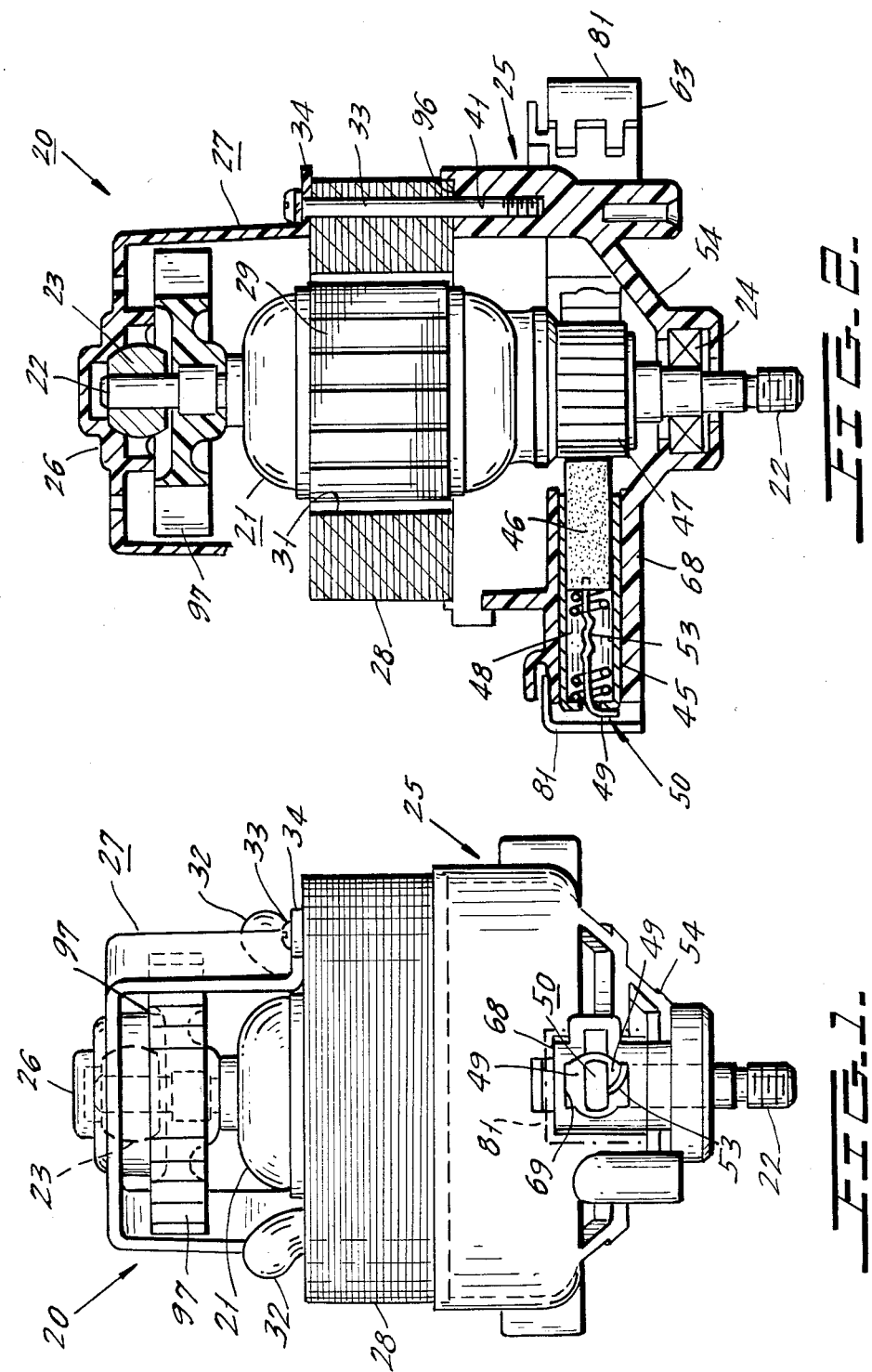

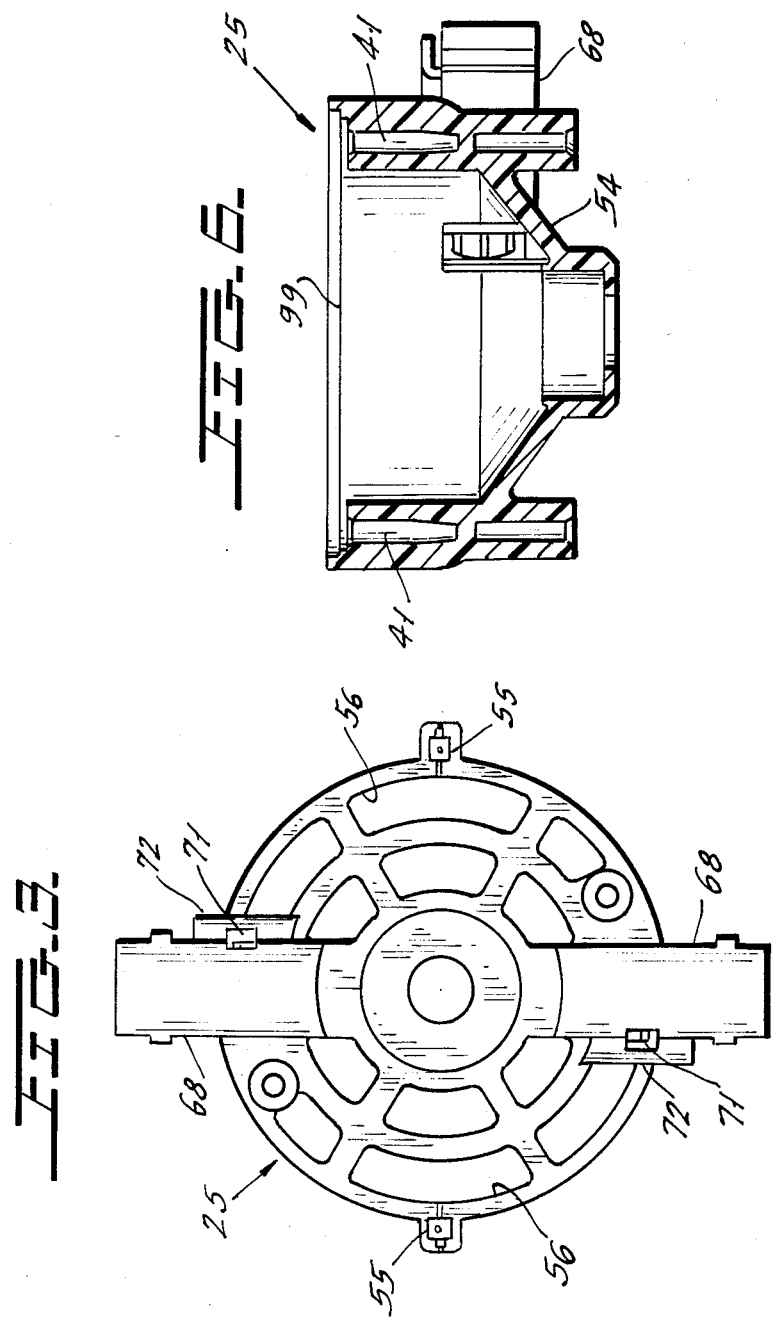

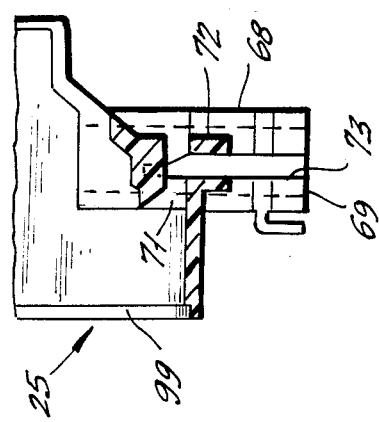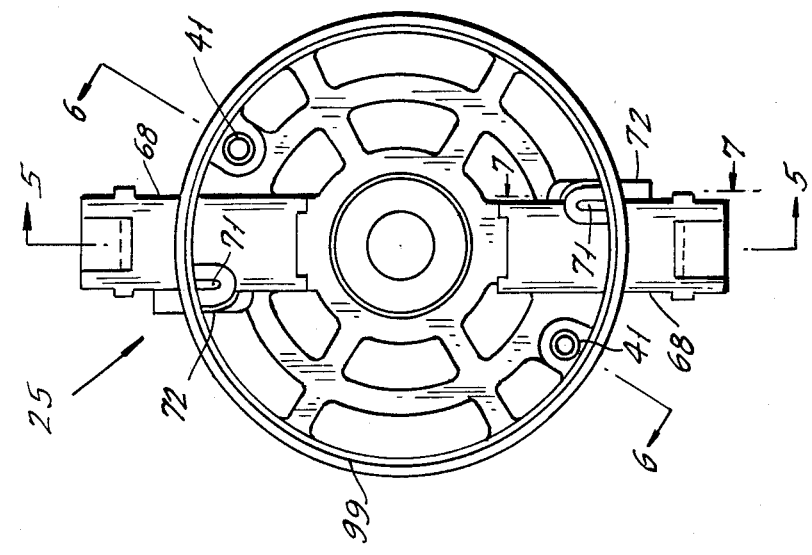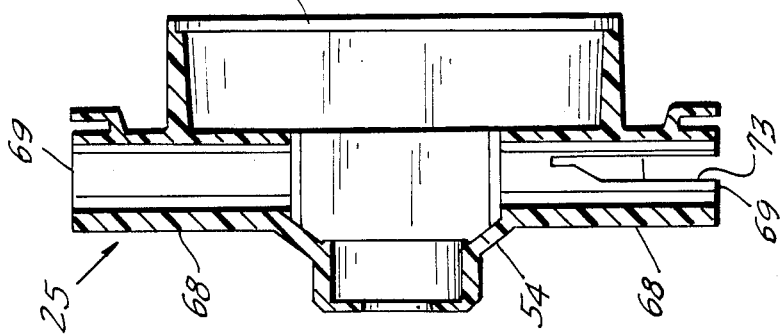

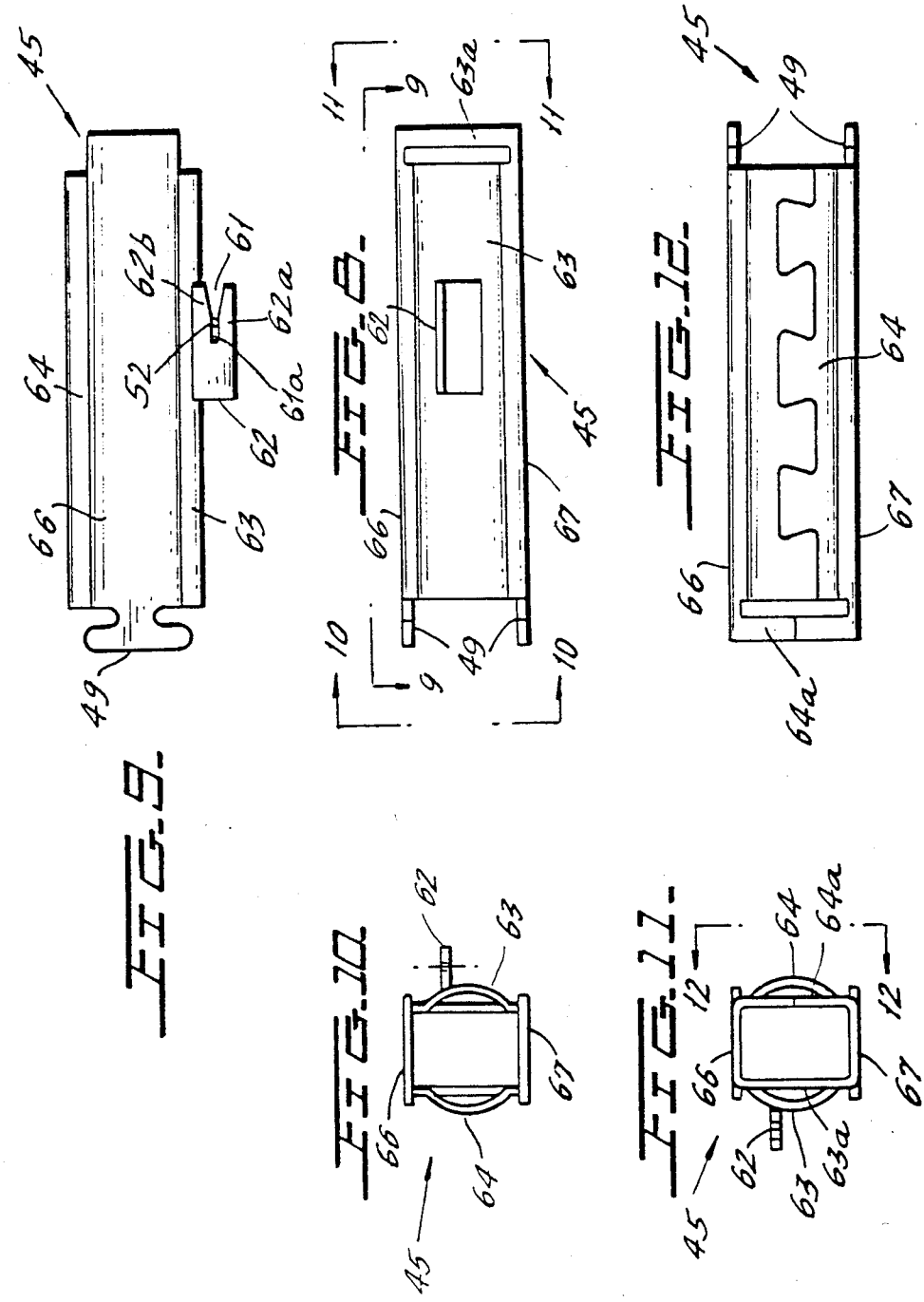

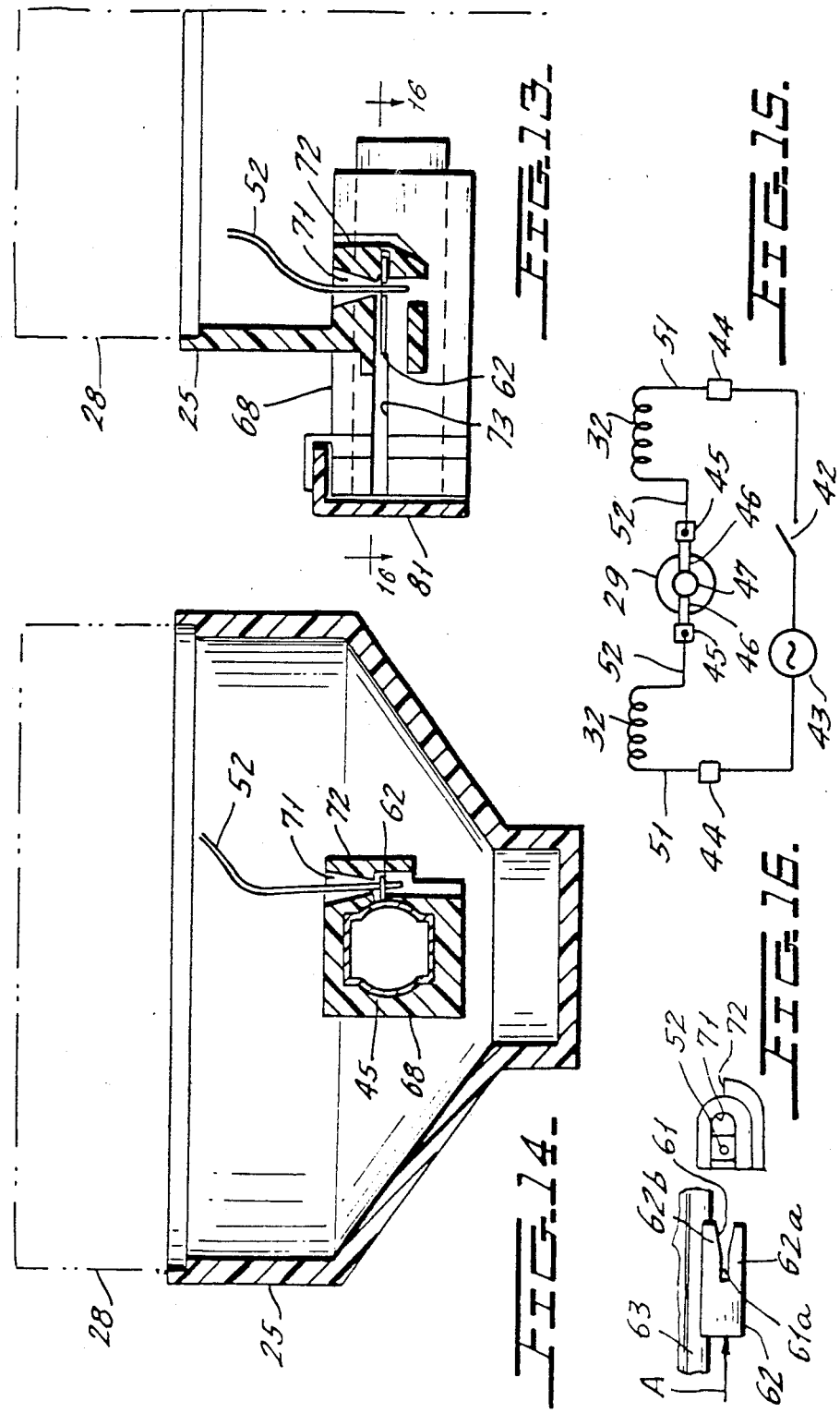

CONNECTION OF MOTOR BRUSH HOLDER TO STATOR COIL

BACKGROUND OF THE INVENTION

This invention relates to small electric motors of the type disclosed in U.S. Pat. No. 4,538,971 issued Sept. 3, 1985 to J. Miller et al. entitled "Assembly of Tank Lid and Fan Means of a Wet/Dry Vacuum." More particularly, this invention relates to the making of electrical connections between the stator windings and brushes of a small electric motor.

Because small electric motors are often produced in large quantities, a small reduction in the cost of parts and/or labor to assemble a motor becomes significant. The prior art has attempted to reduce motor costs by simplifying the making of external circuit connections to the mag-wire of the stationary field windings. A prior art example of such an attempt at cost reduction is found in U.S. Pat. No. 4,322,647 issued Mar. 30, 1982 to T. H. Neroda for "Motor Assembly". In U.S. Pat. No. 4,322,647, solderless terminal connectors are utilized for connecting the stationary field windings in circuit. This type of arrangement requires that each coil end be carefully placed in a cavity and, thereafter, as the solderless connector is pushed into the cavity the coil end is engaged and frictionally held by the connector.

SUMMARY OF THIS INVENTION

In accordance with the instant invention, for each stationary field coil one end thereof is automatically positioned by a locating means as the stationary field piece, having the field coils mounted thereon, is located in its operating position. Thereafter, movement of a brush assembly to its operative position within an insulating sleeve automatically completes an electrical connection between the coil end and conducting tube having a commutator engaging brush projecting therefrom. Actual engagement between the conducting brush tube and the coil end is made by the clamping jaws of a tab that is formed integrally with the conducting tube and projects from a side thereof. The jaws define a narrow, longitudinally extending slot that receives the coil end as the brush assembly moves radially inward through the insulating sleeve. This relative movement between the tab and the coil end causes the jaws to scrape away and to pierce the thin insulating coating on the wire of the field coil so that the jaws directly engage the coil conductor. In addition, this relative movement causes a slight flattening of the coil conductor to increase the area of electrical contact between the jaws and coil conductor.

OBJECT OF THE INVENTION

Accordingly, a primary object of the instant invention is to provide a small electric motor of reduced cost.

Another object is to provide a small electric motor that is constructed so as to reduce the costs of both parts and assembly.

Still another object is to provide an electric motor construction in which one end of a field coil is connected in circuit by merely inserting a brush assembly into its insulating sleeve.

A further object is to provide an electric motor in which a tab having a pair of wire clamping jaws is formed integrally with the conducting tube of the brush assembly.

BRIEF DESCRIPTION OF THE DRAWINGS

These objects, as well as other objects of this invention, shall become readily apparent after reading the following description of the accompanying drawings in which:

FIG. 1 is a side elevation of an electric motor constructed in accordance with teachings of the instant invention;

FIG. 2 is a longitudinal section of the motor of FIG. 1;

FIG. 3 is a bottom view of the lower housing;

FIG. 4 is a top view of the lower housing;

FIGS. 5, 6 and 7 are cross sections of the lower housing taken through the respective lines 5—5, 6—6 and 7—7 of FIG. 4 looking in directions of the respective arrows 5—5, 6—6 and 7—7;

FIG. 8 is a side elevation of the conducting brush tube prior to bending of the tabs that are located at the rear or radially outward end of the conducting tube;

FIGS. 9, 10 and 11 are elevations of the conducting tube looking in the directions of the respective arrows 9—9, 10—10 and 11—11 of FIG. 8;

FIG. 12 is a side elevation of the conducting tube looking in the direction of arrows 12—12 of FIG. 11;

FIG. 13 is a partially sectioned side elevation of a brush positioning insulating sleeve;

FIG. 14 is a partially sectioned rear view of the elements of FIG. 14; and

FIG. 15 is a schematic of the motor of FIG. 1.

FIG. 16 is a schemtic, taken generally in the plane indicated by the line 16, 16 of FIG. 13 looking in the direction of arrows 16, 16, to explain how the connection between a brush holder and a stator winding is made.

DETAILED DESCRIPTION OF A PREFERRED EMBODIMENT

Now referring to the figures, in which reference numeral 20 designates an electric motor constructed in accordance with teachings of the instant invention, which motor 20 includes wound rotor 21 having shaft 22 which is rotationally supported at opposite ends thereof by bearing 23, 24 (FIG. 2). Upper bearing 23 is swivel mounted to the horizontal web 26 of inverted U-shaped spider 27, and lower bearing 24 is mounted inside and at the bottom of generally cup shaped, molded plastic lower housing 25 of motor 20. Stationary field piece 28, constructed of a stack of magnetic laminations, is sandwiched between spider 27 and lower housing 25, with wound armature 29 of rotor 21 being disposed within central opening 31 of field stack 28. Two multi turn field windings, each designated by reference numeral 32, are wound on field stack 28 in a manner well known to the electric motor art. Two screws 33 that are parallel to shaft 22 extend downward through outwardly turned feet at the lower free ends of the arms for spider 27. Screws 33 also extend through longitudinal bores of field piece 28 and are threadably received in apertures 41, 41 that are open at the top of lower housing 25. Thus, screws 33, 33 interconnect element 25, 27, 28 to form a stationary frame. Fan blade 97, mounted to shaft 22 in a position between web 26 and armature 29, provide a flow of air to cool motor 20.

As illustrated schematically in FIG. 15, stationary field windings 32, 32 are connected in series with armature 29 and the series combination is selectively connected to energizing source 43 through switch 42. As will be hereinafter explained, end 51 of each field winding 32 is connected in circuit by a push type terminal 44 and the other end 52 of each field winding 32 is connected by means of conducting brush tube 45, spring 48, brush 46 and commutator 47 to armature winding 29.

As seen best in FIG. 2, carbon brush 46 protrudes from the open front of formed sheet metal conducting brush tube 45 and is biased forward (radially inward direction) by coil spring 48 to engage the periphery of commutator 47. Coil spring 48 is a conducting and compression member that is disposed within conducting tube 45, with one end of spring 48 bearing against inwardly folded tabs 49, 49 at the rear of tube 45. The opposite end of spring 48 is fixedly connected to the rear of brush 46 to limit outward movement of the latter, as radially inward movement of spring 48 is limited by narrow side portions 63a, 64a (FIGS. 8-12) at the front of the tube, and to provide a reliable electrical connection between brush 46 and tube 45. If spring 48 is not fixedly connected to brush 46, flexible conductor 53 is connected between one of the tabs 49 and the rear of brush 46, to limit outward movement of the latter and to provide a reliable electrical connection between tube 45 and brush 46.

In a manner well known to the art, each of the coils 32 is constructed of so-called magnet wire which is a conductor having a relatively thin, yet effective, layer of insulation enamel adhered to and covering the outside thereof. Ends 51, 52 of each coil 32 are connected respectively to power terminal 44 and brush tube 45. That is, coil ends 51, 51 extend downward from field piece 28 through two of the many apertures 56 in the inclined wall 54 of housing 25 and are placed within suitably shaped diametrically opposed cavities 55, 55 (FIG. 3) that are accessible at the bottom of housing 25. Push type terminals 44, 44, of a type illustrated in the aforesaid U.S. Pat. No. 4,322,647 and shown only schematically in FIG. 15, are entered into recesses 55, 55 to make the external circuit connection with coil ends 51, 51. The connections between each of the coil ends 52, 52 and a brush tube 45 are made by placing a coil end 52 into the narrow rear portion of slit 61 (FIG. 9) through the tapered, relatively wide mouth at the front (radially inward end) of slit 61.

The latter is cut in transverse tab 62 formed integrally with sidewall 63 of elongated tube 45 (FIGS. 8-12). Sidewall 63, as well as opposite sidewall 64, are outwardly bowed and are connected to one another by flat top and flat bottom walls 66, 67 respectively. The narrow side portions 63a, 64a of tube 45, positioned forward of the respective sidewalls 63, 64, combine with upper and lower walls 66, 67 to conform generally to the rectangular cross section of brush 46 so as to guide movement of the latter.

Each brush assembly 50 (FIG. 2), consisting of brush 46, formed sheet metal tube 45, and spring 48, is operatively mounted by being inserted longitudinally into an individual one of the two diametrically opposed insulating sleeves 68 through the rear or radially outer end 69 thereof. Sleeves 68 are outwardly projecting integral portions of lower housing 25. There is a friction fit between conducting brush tube 45 and sleeve 68 which maintains brush assembly 50 in its operative position longitudinally of sleeve 68, even as against the force exerted by spring 48. Removable protective insulating cap 81 is snap fitted to sleeve 68 in a position to cover rear opening 69.

Prior to assembling field piece 28 to lower housing 25, coils 32 are wound on field piece 28. When the latter is being positioned on narrow internal ledge 99 within lower housing 25, coil ends 51, 52 extend below pole piece 28 with ends 51 passing through housing apertures 56, and with coil ends 52 passing through guideways 71 that are formed in integral formations of housing 25 by which formations 72 are positioned on one side of each sleeve 68. As seen in FIG. 13, this same side of sleeve 68 is provided with guide slot 73 which extends from the front of formation 72 and is open at the rear of sleeve 68. Slot 73 provides a clearance through which tab 62 travels as assembly 50 is inserted into sleeve 68. During this insertion process for brush assembly 50, tab 62 moves radially inward of in the forward direction (indicated by arrow A in FIG. 16) relative to coil end 52 which is positioned in the narrow lower end of guideway 71. The path of tab 62 is such that the wide open front end of slit 61 receives coil end 52, and in the final operative position of brush assembly 50 coil end 52 is positioned so show in in FIG. 9, in the narrow closed end 61a of slit 61. The relative dimensions between the conductor portion of coil end 52 and the narrow portion 61a of slit 61 causes the insulation on coil end 52 to be pierced and causes the normally circular conductor portion to be slightly deformed by the parallel boundary edge portions of tab 62 that define the narrow portion of slit 61. This slight deformation assures that there will be a firm clamping action exerted by the bifurcated jaw portions 62a, 62b (FIG. 9) of tab 62 acting on coil end 52 to provide a reliable, low resistance electrical connection between coil 32 and brush tube 45.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. An electric motor comprising:
   a wound rotor including an armature, a shaft defining a rotational axis for said rotor, and a commutator in a circuit with said armature for connecting the latter to a motor energizing source;
   a stator including magnetic core means having an opening wherein said armature is rotationally disposed, and stator winding means coupled to said core means to generate magnetic flux in said core means, which flux interacts with electric current flowing in said armature to rotate said rotor about said axis;
   brush means connected in circuit between said commutator and a motor energizing source, frame means on which said rotor is operatively mounted for rotation about said axis, and support means operatively mounting said brush means to said frame means;
   said brush means comprising first and second sections each including a conducting tube, a brush conductively connected with said tube and having a radially outer end disposed within said tube and a radially inner end biased into engagement with said commutator;
   a conductor tab on each of said tubes, and each of said tabs having a slit with an open end disposed at an edge of said tab;
   said stator winding means comprising multiple turns of wire coated with insulation;

said wire having first and second end portions disposed within the slits of the respective first and second sections in direct contact with first and second confronting longitudinal boundary edges defining each of said slits, to electrically connect the first and second end portions with the terminal tabs of the respective first and second sections;

for each of said sections of said brush means said slit thereof extends generally radially and the open end thereof is radially inward.

2. An electric motor as set forth in claim 1 in which for each of said sections of said means said boundary edges clamp said wire therebetween, having pierced the insulation subsequent to entry of said wire into said slit through its open end.

3. An electric motor as set forth in claim 2 in which for each of said sections of said brush means said wire has been partially flattened by entry thereof into said slit.

4. An electric motor as set forth in claim 1 also comprising first and second formations on said frame means to operatively position the respective first and second end portions of said wire for entry into the slits of the respective first and second sections of said brush means as the latter are guided by said support means for radially inward movement to their operating positions.

5. An electric motor as set forth in claim 4 in which for each of said sections of said brush means the tube is constructed of conducting sheet material and the tab is formed integrally with the tube.

6. An electric motor as set forth in claim 1 in which for each of said sections of said brush means the tab is in a plane that protrudes from a side of the tube and is parallel to the direction of movement for said tube as the latter is guided by said support means for radially inward movement to its operating position.

7. An electric motor as set forth in claim 6 in which said plane is generally perpendicular to said rotational axis.

8. An electric motor as set forth in claim 6 in which the first and second portions of the wire extend generally parallel to said axis and extend alongside a side of said tube having the tab projecting therefrom.

9. An electric motor comprising:
a wound rotor including an armature, a shaft defining a rotational axis for said rotor, and a commutator in a circuit with said armature for connecting the latter to a motor energizing souce;
a stator including magnetic core means having an opening wherein said armature is rotationally disposed, and stator winding means coupled to said core means to generate magnetic flux in said core means, which flux interacts with electric current flowing in said armature to rotate said rotor about said axis;
brush means connected in circuit between said commutator and a motor energizing source, frame means on which said rotor is operatively mounted for rotation about said axis, and support means operatively mounting said brush means to said frame means;
said brush means comprising first and second sections each including a conducting tube, a brush conductively connected with said tube and having a radially outer end disposed within said tube and a radially inner end biased into engagement with said commutator;
a conductor tab on each of said tubes, and each of said tabs having a slit with an open end disposed at an edge of said tab;
said stator winding meand comprising multiple turns of wire coated with insulation;
said wire having first and second end portions disposed within the slits of the respective first and second sections in direct contact with first and second confronting longitudinal boundary edges defining each of said slits, to electrically connect the first and second end portions with the terminal tabs of the respective first and second sections;
first and second formations on said frame means to operatively position the respective first and second end portions of said wire for entry into the slits of the respective first and second sections of said brush means as the latter are guided by said support means for radially inward movement to their operating positions;
for each of said sections of said brush means said tube being constructed of conducting sheet material and the tab being formed integrally with the tube;
for each of said sections of said brush means said tab being in a plane that protrudes from a side of the tube and being parallel to the direction of movement for said tube as the latter is guided by said support means for radially inward movement to its operating position.

10. An electric motor as set forth in claim 9 in which said plane is generally perpendicular to said rotational axis.

11. An electric motor as set forth in claim 9 in which the first and second portions of the wire extend generally parallel to said axis and extend alongside a side of said tube having the tab projecting therefrom.

* * * * *